Dec. 2, 1969  E. K. HUTZLER  3,482,105
OPTICAL FREQUENCY MODULATOR
Filed Sept. 27, 1965
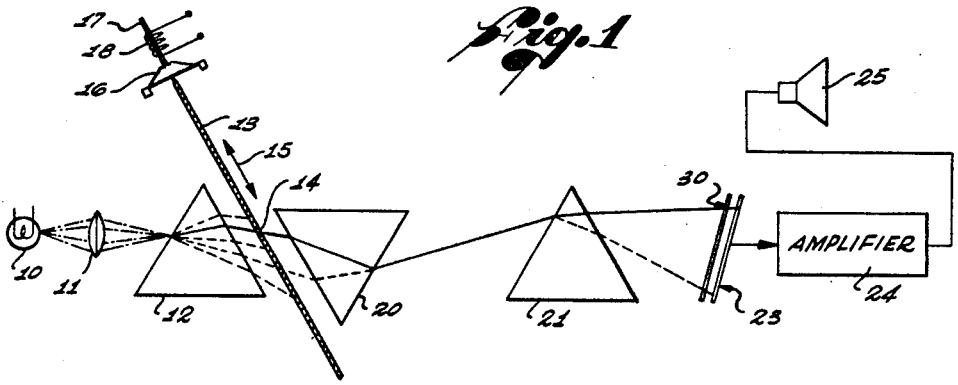
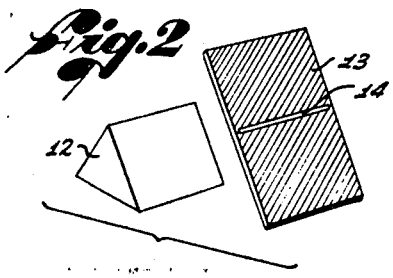
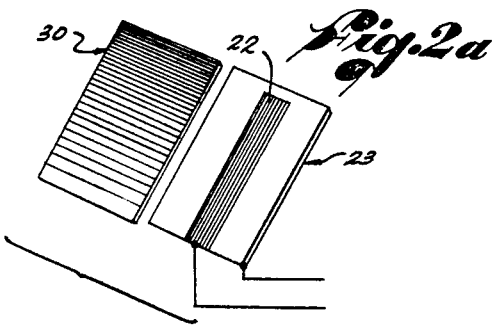
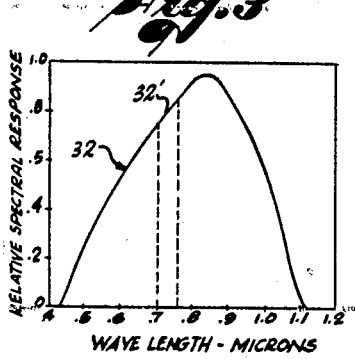
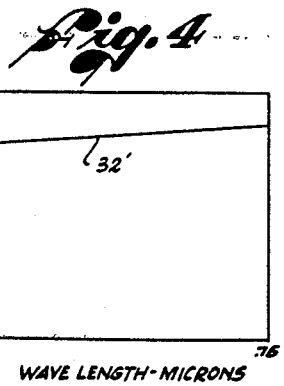
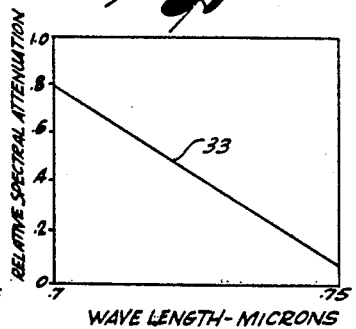
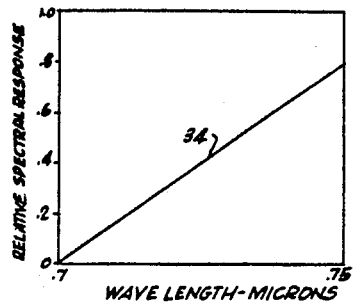
INVENTOR.
ERICH K. HUTZLER
BY Fulwider, Patton, Rieber,
Lee, and Utecht
ATTORNEYS

United States Patent Office 3,482,105
Patented Dec. 2, 1969

3,482,105
OPTICAL FREQUENCY MODULATOR
Erich K. Hutzler, 6721 El Colegio St.,
Goleta, Calif. 93017
Filed Sept. 27, 1965, Ser. No. 490,554
Int. Cl. H01j 39/12
U.S. Cl. 250—226      6 Claims

ABSTRACT OF THE DISCLOSURE

An optical frequency modulation system in which a relatively narrow band of spectral frequencies from a spectrum passes through a narrow slit in a mask with the mask and slit being movable across the spectrum in response to a modulating signal. The narrow band of spectral frequencies moves across a filter and photocell combination and the filter has a light attenuation characteristic which varies linearly with position across the photocell to enhance the spectral frequency response characteristic of the photocell.

---

This invention relates to signaling systems, and more particularly to an improved optical frequency modulation system.

More specifically, this invention relates to an improved system for frequency modulated light beam transmission, of the type wherein light from a polychromatic light source is directed to a prism which divides the light into i.s various components, and wherein a photocell is located in the path of the spectrum emerging from the prism. In some prior art systems, the prism is vibrated in response to audio signals to cause different portions of the spectrum, i.e., different colors or frequencies of light, to be impressed upon the photocell. Thus, the signals from the photocell to an output network vary in accordance with the portions of the spectrum intercepted by the photocell, and such portions in turn vary in accordance with the movements, i.e., amplitude variations, of the vibrating prism.

In another scheme a portion of the dispersed light from the prism is blocked by an opaque bar of substantial width adapted to be vibrated along a portion of the prism. The output from the photocell varies in accordance with variations in the unblocked portions of the spectrum (on one or both sides of the bar) which impinge upon the photocell.

In such prior art systems, a considerable portion or width of the spectrum is permitted to strike the photocell, and reliance is had on the photocell characteristics for discrimination, i.e., to develop maximum output when the red end of the spectrum impinges thereon, and minimum output when it is illuminated by the blue end of the spectrum. However, such systems do not have the desired sensitivity to develop significantly different outputs for slight variations in the portions of the spectrum which strike the photocell.

Accordingly, it is an object of my invention to provide an improved optical frequency modulation system which overcomes the above and other disadvantages of the prior art.

It is another object of my invention to provide an optical frequency modulation system utilizing a photocell having a light sensitive element of sufficient area to span desired frequencies of dispersed light from a prism, but wherein light impinging upon the element at any given instance is more nearly monochromatic than has been possible heretofore.

It is also an object of my invention to provide an improved optical frequency modulation system comprising a minimum number of component parts of simple design, capable of reliable operation over a long operating life.

The above and other objects and advantages of my invention will become apparent from the following description taken in conjunction with the accompanying drawing of an illustrative embodiment thereof, in which:

FIGURE 1 is a schematic diagram of an optical frequency modulation system in accordance with my invention, showing a dispersive prism covered by an opaque mask having a narrow slit therein for limiting the light passing through it as nearly as possible to a single color frequency, which light is directed through additional prisms to a filter element that covers the light sensitive element of the photocell, and showing light rays of the portions of the spectrum at the extreme positions of the slit to aid in explaining the operation of the invention;

FIGURES 2 and 2a are perspective views of the mask adjacent the dispersive prism, and of the photocell with the filter element adjacent the light sensitive element thereof;

FIGURE 3 is a graph of the spectral response curve of the photocell;

FIGURE 4 is an expanded version of a portion of the spectral response curve of FIGURE 3;

FIGURE 5 is a graph of the spectral attenuation characteristic of the filter element; and FIGURE 6 is a graph of the spectral response characteristic of the combination of the filter and the photocell.

Referring to FIGURES 1 and 2, there is shown a light source 10, the illumination from which is directed through a converging lens 11 to a dispersing prism 12, from which a spectrum emerges having a band of light frequencies. In the path of the emerging spectrum is an opaque card or mask 13 in which a narrow slit 14 is formed. The card 13 is adapted to be moved back and forth across the spectrum, as indicated by the arrows 15, as by attaching its upper end to a diaphragm 16 of a transducer, e.g., the diaphragm of an electromagnetic microphone, wherein the stem 17 of the diaphragm is actuated longitudinally in response to variations in audio signals applied to the coil 18 thereof.

Accordingly, it will be seen that the card 13 is moved back and forth in a plane parallel to the adjacent face of the prism 12 from which the spectrum emerges. Hence, the slit 14 is moved along the spectrum, whereby, depending upon the position of the slit 14 at any instance, a portion of the spectrum passes through the slit. Thus, the frequencies of the light passing through the slit 14 vary with movement of the card 13, and light passing through the slit 14 is frequency modulated in accordance with amplitude variations of the diaphragm 16, and hence variations in the audio signals applied to the coil 18.

The varying frequency light waves passing through the slit 14 are caused to pass through successive converging and dispersing prisms 20, 21 to the light sensitive surface 22 of a photoelectric device such as a photocell 23 with a selected range of frequencies occupying a predetermined physical length on the photocell. The signals developed by the photocell 23 are fed to an amplifier and discriminator network 24, the output of which is coupled to a loudspeaker 25. As will be apparent, the prism 20 is part of a transmitter and the prism 21 is part of a receiver, which may be spaced apart as needed for short and long range transmission and reception.

It will be seen that as the diaphragm 16 moves the card 13, light strikes different portions of the predetermined physical length of the light sensitive element 22 of the photocell 23. Since these light beams are constituted of different portions of the spectrum, the photocell is caused to receive varying frequency signals, i.e., the signals at the photocell are frequency modulated in accordance with the amplitude variations of the audio signals in the coil 18 as reflected in vibratory movements of the diaphragm 16.

In accordance with my invention, the changes in the light frequencies striking the light sensitive element 22 of the photocell 23 are enhanced by filter means, indicated as a filter element 30, in front of the light sensitive element 22. Referring to FIGURE 2, the filter element 30 is characterized by a linearly changing light transmissibility along its length, from near opacity at one end to clear transparency at the other end thereof. The card 13 is adapted for vibratory movement within the selected range of spectral frequencies and the various elements are spaced so that at the extreme positions of the card the light beams emerging through the slit 14 pass through the end portions of the filter element 30. The filter element 30 may, for example, be a tinted glass.

The photocell 23 is characterized by maximum sensitivity in the range of color frequencies over which the slit 14 in the card 13 is to be moved. Referring to FIGURES 3-6, FIGURE 3 illustrates the spectral response curve 32 of one photocell, wherein the substantially straight line portion 32' lies between 0.7–0.75 micron. This straight line portion 32' is shown on an expanded scale in FIGURE 4. To the same expanded scale in FIGURE 5, a curve 33 is shown which represents the spectral attenuation characteristic, of the filter element 30 between wave lengths from 0.7–0.75 micron. As shown, the attenuation is greatest at the shorter wave lengths, and decreases linearly to a minimum at the longer wave lengths.

FIGURE 6 represents the combination of the graphs of FIGURES 4 and 5, wherein the curve 33 is substracted from the curve 32', resulting in composite curve 34 which represents the spectral response of the combination of the filter 30 and the photocell 23. As shown, the composite curve 34 ranges linearly from negligible spectral response at the higher frequencies (shorter wave lengths) to a maximum at the lower frequencies (longer wave lengths).

The significance of the combined effects of the filter element and the photocell characteristics will now be apparent from an inspection of FIGURES 4 and 6. Without the filter element (as in FIGURE 4), light emerging from the slit 14 in the vibrating card can vary between the extremes of 0.7 and 0.75 micron without any significant change in spectral response, and hence no significant change in photocell output. However, and as is indicated in FIGURE 6, even so slight a change as 0.005 micron, e.g., from 0.7 to 0.705 micron, results in a greater change in spectral response than is obtainable without the filter element. Accordingly, my invention assures significant and readily detectable differences in photocell output for a change of frequencies too slight to be detected with prior art systems.

It will be apparent from the foregoing that various modifications can be made in the system and parts thereof illustrated herein without departing from the spirit of my invention. Accordingly, I do not intend that my invention be limited, except as by the appended claims.

I claim:

1. An optical frequency modulation system comprising:
   a prism for dispersing light into a spectrum;
   a card having a narrow slit therein;
   means for moving the card across the spectrum, whereby to permit only a relatively narrow portion of the spectrum to pass through said slit;
   a photocell in the path of the portions of the spectrum passing through said slit, said photocell having a linear spectral response characteristic having a positive slope in a predetermined range of the color frequencies passing through said slit; and
   filter means adjacent said photocell in the path of the portions of the spectrum striking said photocell, said filter means having a linear light attenuation characteristic having a negative slope within said range of frequencies, said attenuation characteristic being such as to effect a more pronounced change in photocell current for a given change in color frequencies within said range than is possible with the photocell alone.

2. For use in an optical frequency modulator employing light dispersing means adapted to provide a predetermined spectral range of light freqeuncies with said range occupying a predetermined physical length, the combination of:
   a photocell in the path of said range of light frequencies, said photocell having a substantially linear spectral response characteristic over said predetermined range of light frequencies; and
   a filter element adjacent said photocell and positioned so that said range of light frequencies occupying said physical length passes through said filter element before reaching said photocell, said filter element having a linearly varying light attenuation characteristic along the corresponding physical length of said filter element through which said range of light frequencies passes so that the spectral response characteristic of the filter element and photocell combined along said corresponding physical length is a linear response of greater slope than that of the photocell alone.

3. In combination:
   a source of light;
   means for splitting the light into a spectrum and directing the spectrum in a predetermined direction;
   a light transmissible element in the path of a predetermined portion of the spectrum, said element having a linear light attenuation characteristic across said path of such negative slope that the element attenuates the shorter wave lengths more than the longer wave lengths;
   a photocell in the path of light passing through said element, said photocell having a linear spectral response characteristic of such positive slope as to develop an electrical output that is greater for longer wave lengths than for shorter wave lengths;
   means between said splitting means and said element for masking the spectrum, including said predetermined portion, except a predetermined part of said portion; and
   means for moving said masking means across said predetermined position to vary the part thereof which passes through said element.

4. An optical frequency modulation system comprising
   means providing a relatively narrow portion of a light spectrum, said portion of the light spectrum being selectively moveable within a predetermined range of light frequencies, said range occupying a predetermined physical length and said portion of the light spectrum physically moving within said range in accordance with a modulating signal;
   a photocell in the path of said predetermined range of light frequencies to develop electrical signals in response to light impinging thereon; and
   a light attenuating element between said providing means and photocell, the light attenuation characteristic of said element being substantially linearly variable along the corresponding physical length of said element through which said range of light frequencies passes whereby said portion of said spectrum is subjected to varying degrees of attenuation within said range before striking said photocell.

5. For use in an optical frequency modulation system wherein a relatively narrow portion of a light spectrum within a predetermined range of light frequencies is developed with variation of said portion being in accordance with a modulating signal, the combination of:

a prism for dispersing said predetermined range of light frequencies into a spectrum of predetermined physical length with the position of said relatively narrow portion of said spectrum varying within said physical length;

photocell means in the path of said predetermined range of said predetermined physical length;

filter means between said prism and said photocell means, said filter means having a light attenuation characteristic which varies substantially linearly along the physical length of said filter means through which said range of light frequencies passes.

6. An optical frequency modulation system, comprising:

a light source;

a first dispersing prism to disperse light from said source into a light spectrum;

a converging prism in the path of said light spectrum from said first dispersing prism to converge said spectrum into substantially a relatively narrow light beam;

masking means moveable between said first dispersing prism and said converging prism, said masking means having a relatively narrow slit therein to allow only a relatively narrow portion of said spectrum to pass from said dispersing prism to said converging prism, said masking means being moveable in accordance with a modulating signal.

References Cited

UNITED STATES PATENTS

| | | | |
|---|---|---|---|
| 2,708,389 | 5/1955 | Kavanagh | 88—14 |
| 2,769,683 | 11/1956 | Skelton | 350—314 |
| 2,823,577 | 2/1958 | Machler | 88—1 |
| 2,952,188 | 9/1960 | Bang | 350—314 |
| 2,973,686 | 3/1961 | Dreyfus et al. | 88—14 |
| 3,175,088 | 3/1965 | Herriott | 88—14 |
| 3,195,405 | 7/1965 | Clark et al. | 350—314 |
| 1,458,165 | 6/1923 | Coblentz | 250—83.3 |
| 1,948,941 | 2/1934 | Olpin | 250—83.3 |
| 2,131,328 | 9/1938 | Michelssen | 250—83.3 |
| 2,721,259 | 10/1955 | Krasno | 88—14 |

FOREIGN PATENTS 124,805  4/1919  Great Britain.

JAMES W. LAWRENCE, Primary Examiner

DAVID O'REILLY, Assistant Examiner

U.S. Cl. X.R.

250—199; 356—97

PO-1050
(5/69)

UNITED STATES PATENT OFFICE
CERTIFICATE OF CORRECTION

Patent No. 3,482,105            Dated Dec. 2, 1969

Inventor(s) E. K. HUTZLER

It is certified that error appears in the above-identified patent and that said Letters Patent are hereby corrected as shown below:

Column 4, Line 49, after "determined", delete "position"

and substitute therefor --portion--.

SIGNED AND
SEALED
JUN 9 1970

(SEAL)
Attest:

Edward M. Fletcher, Jr.
Attesting Officer

WILLIAM E. SCHUYLER, JR.
Commissioner of Patents